(12) United States Patent
Rickerts et al.

(10) Patent No.: US 11,938,438 B2
(45) Date of Patent: Mar. 26, 2024

(54) METHOD AND DEVICE FOR FILTERING CONTAMINATED AIR

(71) Applicant: Oerlikon Textile GmbH & Co. KG, Remscheid (DE)

(72) Inventors: Stephan Rickerts, Grossenaspe (DE); Ernst Claussen, Steinfeld (DE); Hauke Petersen, Oering (DE); Frank Knödler, Brügge (DE); Sonja Dittscher, Trappenkamp (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 504 days.

(21) Appl. No.: 17/282,151

(22) PCT Filed: Oct. 8, 2019

(86) PCT No.: PCT/EP2019/077165
§ 371 (c)(1),
(2) Date: Apr. 1, 2021

(87) PCT Pub. No.: WO2020/074479
PCT Pub. Date: Apr. 16, 2020

(65) Prior Publication Data
US 2021/0354068 A1   Nov. 18, 2021

(30) Foreign Application Priority Data
Oct. 13, 2018 (DE) .................... 10 2018 008 122.3

(51) Int. Cl.
*B01D 46/00* (2022.01)
*B01D 46/64* (2022.01)
*B01D 46/88* (2022.01)

(52) U.S. Cl.
CPC ......... *B01D 46/88* (2022.01); *B01D 46/0005* (2013.01); *B01D 46/64* (2022.01);
(Continued)

(58) Field of Classification Search
CPC .......................... B01D 46/00; B01D 46/0005
See application file for complete search history.

(56) References Cited

U.S. PATENT DOCUMENTS

| 2005/0150382 A1 | 7/2005 | Sheehan et al. |
| 2013/0068098 A1 | 3/2013 | Haslam |
| 2015/0336042 A1 | 11/2015 | Welke |

FOREIGN PATENT DOCUMENTS

| CN | 107913551 | 4/2018 |
| DE | 20011589 | 1/2001 |

(Continued)

*Primary Examiner* — Robert A Hopkins
(74) *Attorney, Agent, or Firm* — BainwoodHuang (57) ABSTRACT

In accordance with certain techniques for filtering contaminated air, the air is sucked through at least one filter element, which is exchangeably held in a filter-holding device of an air duct system. In order to enable continuous filtering without process interruption, a plurality of filter elements is stored in the filter-holding device in such a way that, when one of the filter elements is removed, the soiled filter element is automatically replaced in the air duct system. For this purpose, the filter-holding device has a plurality of filter chambers, which are arranged relative to one another in such a way that, in the event of an exchange, the filter element can be slidingly guided from one of the filter chambers into another filter chamber.

15 Claims, 6 Drawing Sheets

(52) U.S. Cl.
CPC ...... *B01D 2258/06* (2013.01); *B01D 2273/28* (2013.01); *B01D 2273/30* (2013.01)

(56) References Cited

FOREIGN PATENT DOCUMENTS

FR           2390195       12/1978
KR     100461437 B1 *  2/2004

* cited by examiner

METHOD AND DEVICE FOR FILTERING CONTAMINATED AIR

The invention relates to a method for filtering contaminated air as disclosed herein, as well as to a device for filtering contaminated air as disclosed herein.

The medium of air is used in many diverse ways for treating fibers and threads in production plants for fibers or threads. For example, conditioned air is used for cooling freshly extruded filaments or for cooling treated strands of fibers, for example. Applications in which the air is used for entangling or texturing multifilament threads are likewise known. In order for used air of this type to be returned to the environment, it is however necessary for the air to be relieved of suspended particles. For this purpose, filter devices are disposed in an intake flow of the air, wherein one or a plurality of filter elements are passed through for filtering and cleaning the air. However, the service life of filter elements of this type is limited, depending on the degree of contamination of the air. In principle, various types of filter devices for increasing the service life of filter elements are known in the prior art.

In a first variant of filter devices, which is known from DE 28 02 369 A1, for example, a filter installation having a filter element which is configured as a drum filter is disposed in an air duct system. A movable suction nozzle for relieving the surface of suspended particles adhering to the latter is assigned to the drum filter. Filter elements of this type which are cleaned during operation have the advantage that the production process can continue without interruptions. However, filter devices of this type reach their limits when fine filter elements are to be cleaned during operation.

A second genre of filter devices, which is disclosed for example in DE 91 01 692 U1, have a filter installation having a replaceable filter element in an air duct system. In filter devices of this type, the filter element is completely retrieved from the filter installation and supplied to a cleaning process. However, the disadvantage of filter devices of this type lies in that the production process typically has to be interrupted in order for the filter elements to be changed.

It is therefore an object of the invention to provide a method for filtering contaminated air as well as a device for filtering contaminated air of the generic type, in which the contaminated air can be filtered continuously, without any interruption of the process, and with a consistent quality.

This object in terms of the method is achieved according to the invention in that a plurality of filter elements are kept available in the filter receptacle installation in such a manner that a self-acting replacement of the contaminated filter element in the air duct system takes place when one of the filter elements is retrieved.

In terms of the device according to the invention, the solution lies in that the filter receptacle installation for receiving a plurality of filter elements has a plurality of filter chambers which are mutually disposed in such a manner that the filter element when being replaced is able to be guided in a sliding manner from one of the filter chambers into another filter chamber.

Advantageous refinements of the invention are defined by the features and combinations of features as disclosed herein.

The invention is distinguished in that a replacement of the filter element can be carried out without interrupting the process. The contaminated air can be continuously suctioned and filtered through the filter element. The degree of contamination of the filter element can be identified as a function of a pressure differential that is usually measured in such systems, such that a self-acting replacement of the contaminated filter element takes place in the air duct system when one of the filter elements is retrieved. It is guaranteed on account thereof that the contaminated air is continuously suctioned through one of the filter elements without any substantial interruption.

In order for ideally no unfiltered air to arise during the replacement of the filter elements, the method variant in which the filter elements are held in filter chambers that are disposed on top of one another and, when replacing the contaminated filter element, are connected to one another so as to form a gravity chute is particularly advantageous. The maximum gravity acting on the filter elements can thus be advantageously utilized for accelerating the replacement.

In the case of high negative pressures in the air duct system, the method variant in which a vacuum for assisting the replacement of the filter elements is generated in a lower one of the filter chambers has proven particularly successful. A suction effect which conveys the filter element situated in the air duct system into the lower filter chamber is thus generated within the filter chambers that are combined so as to form a gravity chute. A filter element getting stuck in the air duct system by virtue of a high negative pressure can thus be avoided.

The contaminated filter element that has plunged into the lower filter chamber also continues to assist the filtration of the contaminated air in that, on account thereof, the substituted filter element is held in the operating position thereof. In order to obtain ideally minor pressure fluctuations during a replacement of one of the filter elements, the method variant in which a new filter element is kept available in a plug-in chamber, and wherein the plug-in chamber for replacing the spent filter element is connected to the upper filter chamber, is preferably embodied. The new substituted filter element can thus be introduced into the upper filter chamber from a closed plug-in chamber. Suctioning of external air is avoided on account thereof.

In order to ensure that a new filter element is able to be introduced into the air duct system when the contaminated filter element is retrieved from the lower filter chamber, the method variant in which the contaminated filter element can be retrieved only once the connection between the new filter element and the spent filter element has been released is used. Logical interconnections of this type guarantee that the contaminated air is filtered with a high degree of reliability in terms of the operating procedures.

The device according to the invention for filtering contaminated air possesses the particular advantage that continuous filtration is possible without an interruption of the process, on the one hand, and the filter elements can be intensively cleaned, on the other hand. A new filter element can thus be introduced in a simple manner into the air duct system on account of gravity, wherein the spent filter element plunges into a lower filter chamber. A height differential in the filter receptacle installation is thus utilized in order for a rapid replacement of the filter elements in the filter receptacle installation to be performed.

The refinement of the device according to the invention in which the filter chambers of the filter receptacle installation form a gravity chute in which the filter elements are held on top of one another is particularly effective. This allows maximum gravity to be used to exchange the filter elements.

In a further refinement of the device according to the invention, the filter element between the air inlet and the air outlet is held in an upper one of the filter chambers which is configured so as to be air-permeable between the air inlet and the air outlet and has an upper filter opening for a new filter element to drop in.

The filter element during operation thus has a defined position within the air duct system.

In order for pressure losses to be minimized and to prevent any intake of external air, the filter opening of the upper filter chamber is closed by a sliding lid which is configured so as to be movable for opening and closing the upper filter chamber. The sliding lid herein can be guided in a manual or automated manner. The air duct system is thus sealed in relation to the environment.

In order for the filter receptacle installation to be closed also toward the bottom, the lower filter chamber has closed chamber walls and a lateral retrieval opening having a closable cover. The cover of the lower filter chamber is opened only when required in order for one of the contaminated filter elements to be retrieved.

In order to obtain an ideally uninterrupted filtered airflow during the replacement phase and to minimize the pressure losses, the refinement of the invention in which the filter receptacle installation above the upper filter chamber has a plug-in chamber having a closable plug-in opening is preferably embodied, wherein the plug-in chamber is able to be connected to the upper filter chamber. When replacing the contaminated filter element, the new filter element can thus be introduced into the air duct system from a closed plug-in chamber. Any intake of external air is avoided, and the negative pressure relevant to the operation can also be maintained during the replacement phase of the filter element.

In order for a replacement of the filter elements to be handled in an ideally simple manner, the filter elements are preferably formed by a filter cartridge which has at least one filter material in a frame. Depending on the filter grade, woven fabrics, wires, or non-woven materials can be used as a filter material herein.

The refinement of the device according to the invention in which a plurality of filter receptacle installations by way of which a plurality of filter elements having different filter materials are held between the air inlet and the air outlet are provided beside one another in parallel on the air duct system is particularly advantageous in order for the service life to be increased until the filter elements are replaced. This allows coarse and fine filter materials to be arranged in different filter elements within the air duct system.

The device according to the invention for filtering contaminated air is particularly effective in those cases in which the air outlet opening of the air duct system is connected to a suction connector of a negative-pressure source, in particular to a fan. In principle however, there is also the possibility of disposing the device according to the invention for filtering contaminated air in a pressurized system.

A suction device according to the invention for suctioning contaminated air, having a fan and having a filter device which corresponds to the device according to the invention for filtration, can thus be particularly advantageously used in plants producing fibers and threads, for example. The suction device according to the invention guarantees a continuous uninterrupted operation of the production plant, The method according to the invention for filtering contaminated air will be explained in more detail hereunder by means of a few exemplary embodiments of the device according to the invention for filtering contaminated air with reference to the appended figures.

Figure 1:
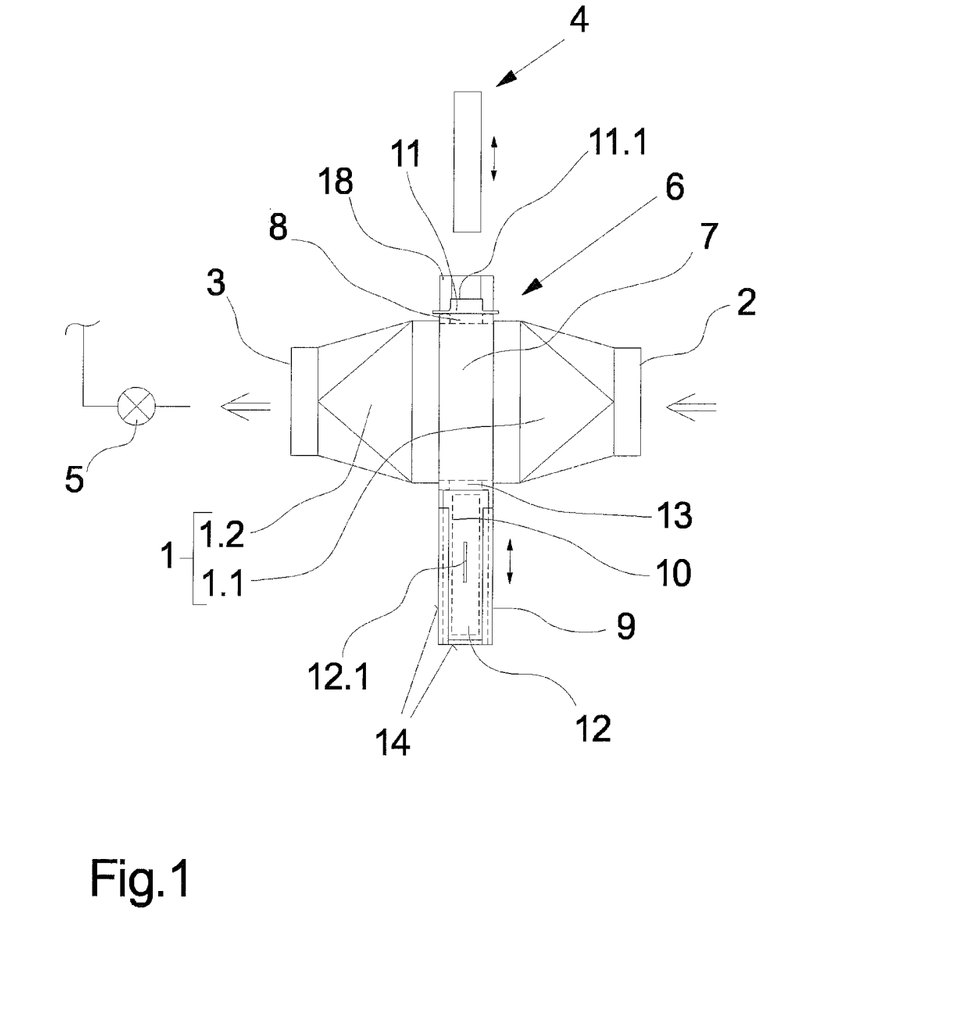
FIG. 1 schematically shows a lateral view of a first exemplary embodiment of the device according to the invention for filtering contaminated air.
Figure 2:
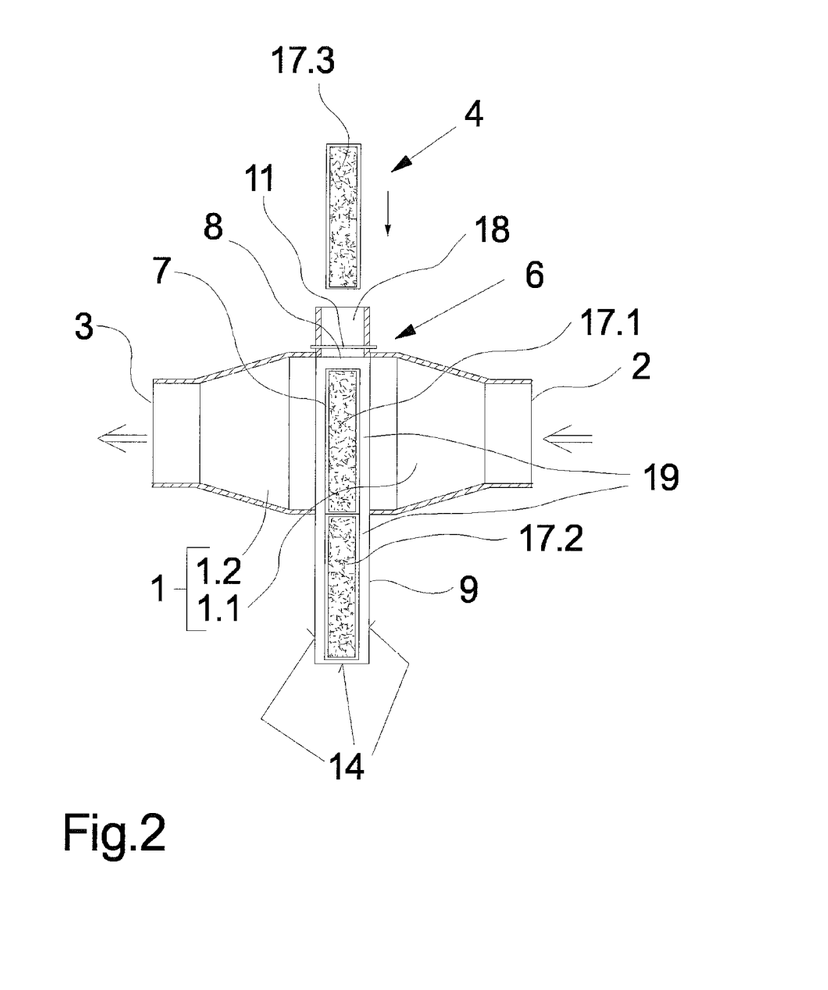
FIG. 2 schematically shows a cross-sectional view of the exemplary embodiment from FIG. 1.
Figure 3:
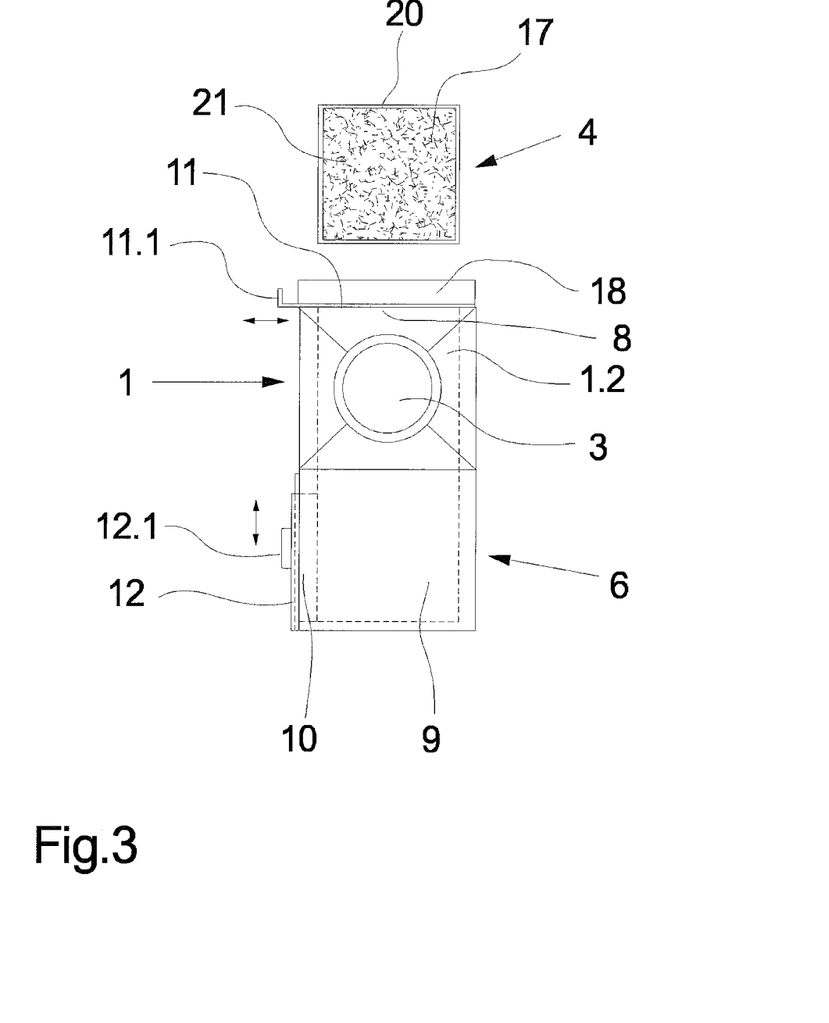
FIG. 3 schematically shows a front view of the exemplary embodiment from FIG. 1.

A first exemplary embodiment of the device according to the invention for filtering contaminated air is schematically illustrated in a plurality of views in FIGS. 1, 2, and 3. The exemplary embodiment is illustrated in a lateral view in FIG. 1, in a cross-sectional view in FIG. 2, and in a front view in FIG. 3. Unless explicit reference is made to any of the figures, the description hereunder applies to all figures.

The exemplary embodiment of the device according to the invention for filtering contaminated air has an air duct system 1. The air duct system 1 is composed of an inlet port 1.1 and an outlet port 1.2 which therebetween enclose a filter receptacle installation 6. The inlet port 1.1 forms an air inlet 2. The outlet port 1.2, opposite the filter receptacle installation 6, forms an air outlet 3.

The filter receptacle installation 6 in this exemplary embodiment has an upper filter chamber 7 which is integrated between the inlet port 1.1 and the outlet port 1.2. The upper filter chamber 7 is embodied so as to be air-permeable and has only lateral chamber walls for receiving a filter element 4. A filter opening 8 which extends across the cross section of the filter chamber 7 is configured on an upper side of the upper filter chamber 7. The filter opening 8 is closed by a sliding lid 11. The sliding lid 11 can be displaced for opening and closing the filter opening 8. To this end, the sliding lid in this exemplary embodiment at a free end has a handle 11.1 such that an operator can activate the sliding lid 11. In principle, the displacement of the sliding lid 11 could also be carried out by a linear drive.

A holding tray 18 into which a filter element can be plugged is disposed above the sliding lid 11.

The upper filter chamber 7 of the filter receptacle installation 6 extends substantially across the cross sections of the inlet port 1.1 and of the outlet port 1.2. A passage opening 13 which extends across the cross section of the upper filter chamber 7 is configured on a lower side of the upper filter chamber 7. The passage opening 13 connect the upper filter chamber 7 with a lower filter chamber 9. The lower filter chamber 9 below the air duct system 1 extends in such a manner that the lower filter chamber 9 can comprise a filter element 4. The lower filter chamber 9 is formed by closed chamber walls 14 and has a lateral retrieval opening 10. The retrieval opening 10 is closed by a cover 12. The cover 12 can be manually displaced for opening the retrieval opening 10. To this end, the cover 12 has a handle 12.1. However, the activation of the cover 12 could also be carried out by an actuator.

The upper filter chamber 7 and the lower filter chamber 9 within the filter receptacle installation form a continuous gravity chute 19 in which the filter elements 4 are held so as to be disposed on top of one another, wherein the lower filter element supports the upper filter element.

As is now derived from FIG. 3, the filter elements 4 are in each case formed by one filter cartridge 17. The filter cartridge 17 has a cuboid frame 20 in which a filter element 21 is held. The filter material 21 herein can be formed by a wire mesh, a woven fabric, or a non-woven material. The corresponding filter material is chosen depending on the requirements in terms of cleaning the air.

During operation, the air outlet 3 is connected to a negative-pressure source. FIG. 1 illustrates a suction installation of this type, wherein the negative-pressure source is identified by the reference sign 5 and illustrated only in a symbolic manner. To this extent, a negative pressure is generated at the air inlet 1 so as to be able to receive and filter air from a production plant. In this situation, as is illustrated in FIG. 2, the filter cartridge 17.1 is for example held in the upper filter chamber 7, between the air inlet 2 and the air outlet 3. The contaminated air suctioned by way of the air inlet 2 is guided through the filter material of the filter cartridge 17.1, and the suspended particles are filtered from the air. The cleaned air exits the air duct system 1 at the air outlet 3. This procedure is repeated until an impermissible contamination of the filter cartridge 7.1 in the upper filter chamber 7 is established. During this period, the filter cartridge 17.2, which has been held since the last replacement, is disposed in the lower filter chamber 9 and supports the filter cartridge 17.1 in the upper filter chamber 7.

As soon as an impermissible contamination of the filter cartridge 17.1 is established, for example by measuring a pressure differential, a replacement of the filter cartridge 17.1 is initiated. First, a new filter cartridge 17.1 is plugged into the holding tray 18 above the filter opening 8. The filter opening 8 and the retrieval opening 10 are still closed in the situation. The sliding lid 11 is now activated by an operator so as to open the filter opening 8 of the upper filter chamber 7. The filter cartridge 17.3 is now supported on an upper side of the filter cartridge 17.1. Thereafter, the retrieval opening 10 is opened by activating the cover 12. The operator, using an auxiliary tool which is molded on the cover 12, for example, now grips the filter cartridge 17.2 in the lower filter chamber 9 and extracts said filter cartridge 17.2 from the lower filter chamber 9. In the case of the filter cartridges 17.1 and 17.3 overcoming the negative pressure acting on the filter cartridge 17.1 by gravity, the filter cartridges 17.1 and 17.3 in the manner of a gravity chute slide downward such that the filter cartridge 17.1 is held in the lower filter chamber 9 and the filter cartridge 17.3 is held in the upper filter chamber 7.

In the case of the negative pressure in the system impeding the filter cartridge 17.1 in sliding from the upper filter chamber 7, the retrieval opening 10 upon retrieval of the filter cartridge 17.2 is immediately closed using the cover 12. A negative pressure is thus again created in the lower filter chamber 9 such that the filter cartridges 17.1 and 17.3 slide down the gravity chute 19 under the effect of suction. As soon as the filter cartridge 17.3 is disposed in an operating position between the air inlet 2 and the air outlet 3 in the upper filter chamber 9, the sliding lid 11 is activated so as to close the filter opening 8 on the upper side of the upper filter chamber 7. The changeover procedure and the replacement of the filter element have been completed in this case. The contaminated air entering by way of the inlet port 1.1 herein is continuously filtered without any significant interruption such that an adjacent production process can continue without interruption. The filter cartridge 17.2 retrieved from the filter receptacle installation 6 is then supplied to a cleaning process, in order to be reintroduced at a next changeover.

Figure 4:
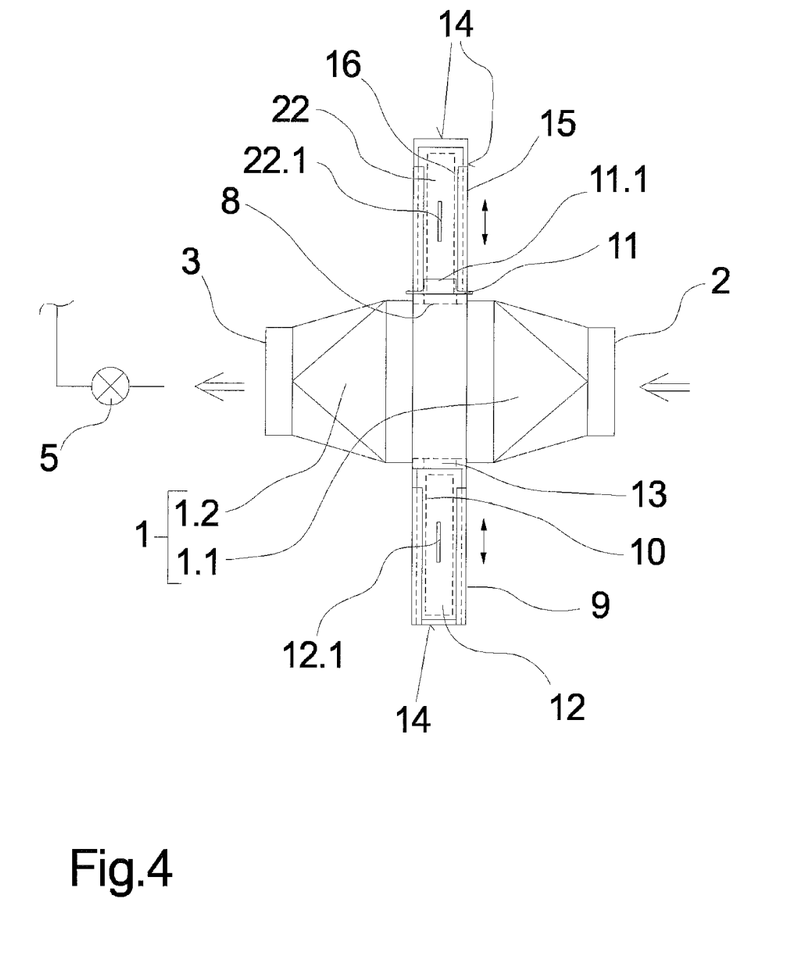
FIG. 4 schematically shows a lateral view of a further exemplary embodiment of the device according to the invention for filtering contaminated air.
Figure 5:
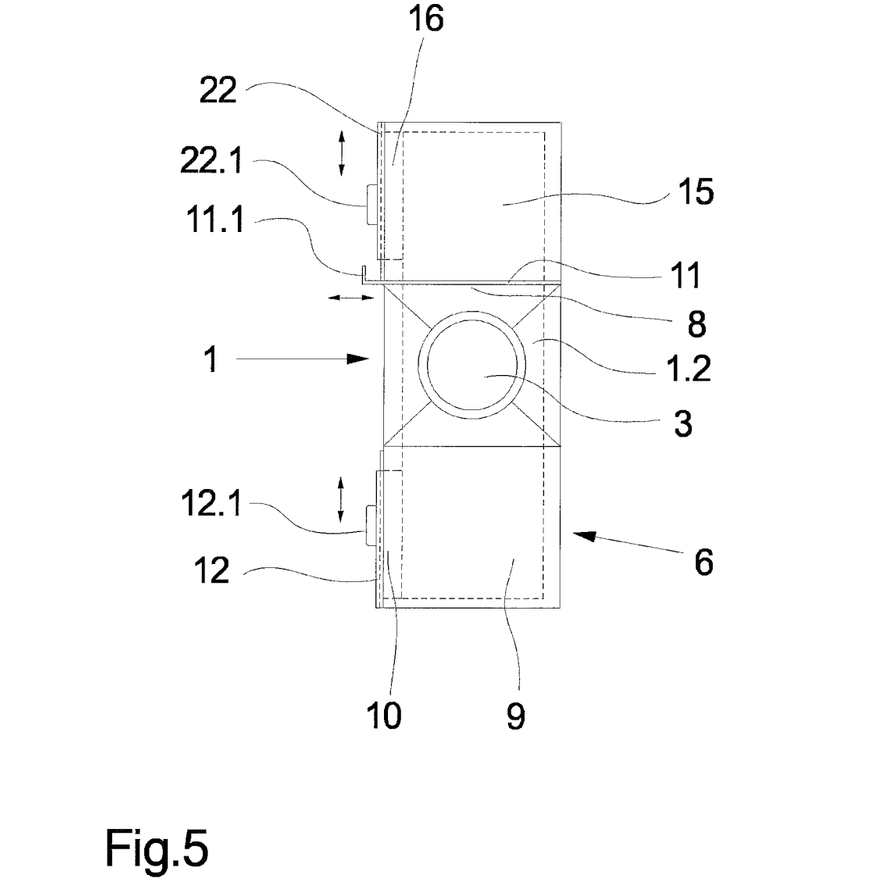
FIG. 5 schematically shows a front view of the exemplary embodiment from FIG. 4.

In order to be able to carry out the changeover of the filter elements ideally without any pressure fluctuations and without the influence of external air in a system which is sensitive to external air, a further exemplary embodiment of the device according to the invention for filtering contaminated air is illustrated in FIGS. 4 and 5. A lateral view is shown in FIG. 4, and a front view in FIG. 5. Unless specific references made to any of the figures, the description hereunder applies to both figures.

The exemplary embodiment of the device according to the invention illustrated in FIGS. 4 and 5 is substantially identical to the exemplary embodiment as per FIGS. 1 to 3 such that only the points of differentiation will be explained at this juncture and reference otherwise is made to the aforementioned description in order to avoid repetitions.

In the exemplary embodiment illustrated in FIGS. 4 and 5 the filter receptacle installation 6 is embodied with an upper plug-in chamber 15. The upper plug-in chamber 15 has a plug-in opening 16 which by way of a covering 22 is embodied so as to be closable. The plug-in chamber 15 is formed by closed chamber walls 14 and by way of a filter opening 8 embodied so as to be permeable in relation to the lower side. The cover 22 is likewise embodied with a handle 22.1 so as to enable a manual operation. The plug-in chamber 15 in the cross section extends across an upper filter chamber 7 and a lower filter chamber 9 which conjointly are able to be connected so as to form a gravity chute 19.

The lower filter chamber 9 and the upper filter chamber 7 of the filter receptacle installation 6 are embodied so as to be identical to the exemplary embodiment as per FIGS. 1 to 3. To this extent, reference is made to the afore-mentioned description.

A sliding lid 11 which closes the filter opening 8 between the plug-in chamber 15 and the upper filter chamber 7 is disposed between the plug-in chamber 15 and the upper filter chamber 7. The sliding lid 11 for opening the filter opening 8 can be activated only once the cover 22 has closed the plug-in opening 16 of the plug-in chamber 15. A new filter element is thus kept available in the plug-in chamber 15 so as to start the procedure already described above in a next replacement of the filter elements. The stocking of the plug-in chamber 15 with a new filter element is independent of the respective changeover procedure such that the contaminated filter cartridge which becomes available in the replacement could thus, after cleaning, be advantageously returned directly into the plug-in chamber. Moreover, the replacement of the filter cartridges takes place with a closed plug-in chamber 15 such that a closed system is prevalent after the filter opening 8 has been opened. The operating pressure level is substantially maintained even when the filter opening 8 is opened.

The functional mode of the exemplary embodiment of the device according to the invention for filtering contaminated air illustrated in FIGS. 4 and 5 is identical to the exemplary embodiment as per FIGS. 1 to 3 such that reference is made to the aforementioned description at this juncture.

Figure 6:
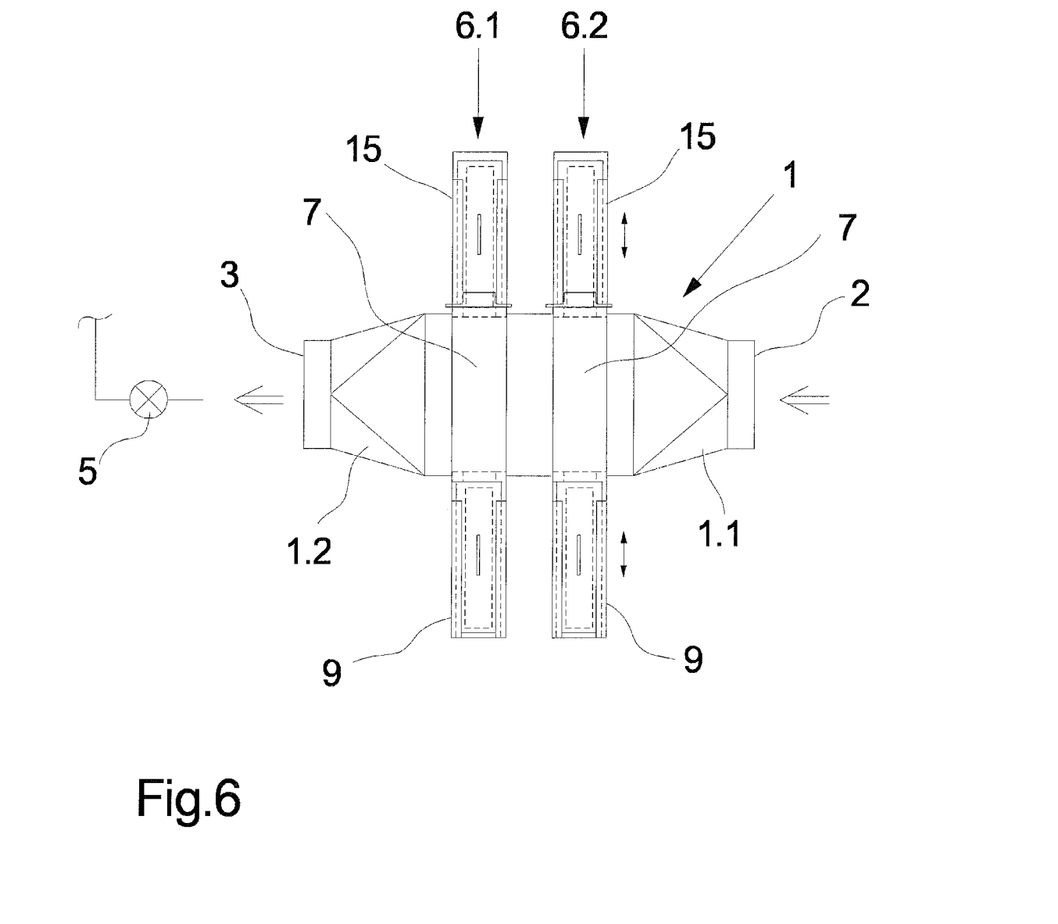
FIG. 6 schematically shows a lateral view of a further exemplary embodiment of the device according to the invention for filtering contaminated air.

The exemplary embodiments of the device according to the invention illustrated in FIGS. 1 to 4 are based on filtering of the air taking place by a filter element. Depending on the specific application, this can however also be advantageous when pre-filtering of coarse component parts takes place so as to collect coarse suspended particles in a preliminary filter, for example. To this end, a further exemplary embodiment of the device according to the invention for filtering contaminated air is schematically illustrated in a lateral view in FIG. 6. A plurality of filter receptacle installations 6.1 and 6.2 are held beside one another in parallel in an air duct system 1 in the exemplary embodiment shown. The filter receptacle installations 6.1 and 6.2 in terms of the construction of the housings thereof are identical to the exemplary embodiment as per FIGS. 4 and 5. To this extent, reference is made to the description of the filter receptacle installations 6.1 and 6.2 of the aforementioned description. Each of the filter receptacle installations 6.1 and 6.2 thus has a plug-in chamber 15, an upper filter chamber 7, and a lower filter chambers 9 which are able to be connected so as to form a gravity chute. Each of the filter receptacle installations 6 contains at least two filter cartridges which are situated in the upper filter chamber 7 and in the lower filter chamber 9. The filter cartridges of the filter receptacle installation 6.1 have a filter material with a wide mesh in order to carry out prefiltering of the air. In contrast, the filter receptacle installation 6.2 has filter cartridges which have a filter material with a fine mesh. Each of the filter receptacle installations 6.1 and 6.2 can be operated independently of the other.

The method according to the invention and the device according to the invention for filtering contaminated air is suitable for filtering a flow of extracted air in any industrial application. The application in the production processes of fibers and threads is particularly advantageous because these processes are carried out in a substantially continuous manner over long operating periods.

In the exemplary embodiments as per FIGS. 1 to 6 the filter receptacle installation is disposed in a vertical manner so as to utilize the maximum possible gravity for replacing the filter elements. In principle however, there is also the possibility for the filter receptacle installation to be disposed at an angular position in the range between 0° and 90°. A sliding incline could thus also be utilized for replacing the filter elements, so as to guide the filter elements from an upper position to a lower position on the filter receptacle installation.

The invention claimed is:

1. A method for filtering contaminated air, in which air is suctioned through at least one filter element, and in which the at least one filter element is held so as to be replaceable in a filter receptacle installation of an air duct system, wherein a plurality of filter elements is held in the filter receptacle installation in such a manner that an automatic replacement of a contaminated filter element of the at least one filter element in the air duct system takes place when one of the filter elements is retrieved, and wherein the filter elements of the plurality of filter elements are held in filter chambers that are disposed on top of one another and, when replacing the contaminated filter element, are connected to one another so as to form a gravity chute.

2. The method as claimed in claim 1, wherein a vacuum for assisting the replacement of the filter elements is generated in a lower one of the filter chambers.

3. The method as claimed in claim 2, wherein the contaminated filter element upon replacement remains in the lower one of the filter chambers and supports a replacement filter element in an operating position.

4. The method as claimed in claim 3, wherein a new filter element is kept available in a plug-in chamber for replacing filter elements, wherein the plug-in chamber is connected to an upper filter chamber.

5. The method as claimed in claim 4, wherein the contaminated filter element can be retrieved only once the connection between the new filter element and the contaminated filter element has been released.

6. A device for filtering contaminated air, having an air duct system which has an air inlet, an air outlet, and a filter receptacle installation, wherein the filter receptacle installation is constructed and arranged to receive a plurality of filter elements and hold at least one filter element between the air inlet and the air outlet, and wherein the filter receptable installation has a plurality of filter chambers which are mutually disposed in such a manner that a filter element when being replaced is able to be guided in a sliding manner from one of the filter chambers into another filter chamber.

7. The device as claimed in claim 6, wherein the filter chambers of the filter receptacle installation form a gravity chute in which the filter elements are held on top of one another.

8. The device as claimed in claim 7, wherein the filter element between the air inlet and the air outlet is held in an upper one of the filter chambers which is configured so as to be air-permeable between the air inlet and the air outlet and has an upper filter opening for a new filter element to drop in.

9. The device as claimed in claim 8, wherein the upper one of the filter chambers has a sliding lid, and wherein the sliding lid is configured so as to be movable for opening and closing the filter opening of the upper one of the filter chambers.

10. The device as claimed in claim 9, wherein a lower one of the filter chambers has closed chamber walls and a lateral retrieval opening having a closable cover.

11. The device as claimed in claim 10, wherein the filter receptacle installation above the upper one of the filter chambers has a plug in chamber having a closable plug-in opening, and wherein the plug-in opening is able to be connected to the upper filter chamber.

12. The device as claimed in claim 6 wherein the filter elements are in each case formed by a filter cartridge which is formed from a frame and at least one filter material.

13. The device as claimed in claim 6 wherein a plurality of filter receptacle installations by way of which a plurality of filter elements are held between the air inlet and the air outlet are provided beside one another in parallel on the air duct system, and wherein the filter elements are configured with different filter materials.

14. The device as claimed in claim 6 wherein the air outlet of the air duct system is constructed and arranged to connect with a suction connector of a negative-pressure source which uses a fan.

15. A suction device for suctioning contaminated air, having a fan and a filter device as claimed in claim 6.

\* \* \* \* \*